US009126747B2

(12) United States Patent
Burgess et al.

(10) Patent No.: US 9,126,747 B2
(45) Date of Patent: Sep. 8, 2015

(54) INSULATED COOLER

(75) Inventors: Roddy Burgess, Charlotte, NC (US); Ian Cunningham, Huntersville, NC (US); Thomas E. Hanna, Huntersville, NC (US); Robert J. Warner, Jr., Charlotte, NC (US)

(73) Assignee: RUBBERMAID INCORPORATED, Huntersville, NC (US)

( * ) Notice: Subject to any disclaimer, the term of this patent is extended or adjusted under 35 U.S.C. 154(b) by 210 days.

(21) Appl. No.: 12/964,948

(22) Filed: Dec. 10, 2010

(65) Prior Publication Data

US 2011/0139672 A1 Jun. 16, 2011

Related U.S. Application Data

(60) Provisional application No. 61/285,721, filed on Dec. 11, 2009.

(51) Int. Cl.

| | |
|---|---|
| ***A47J 39/00*** | (2006.01) |
| ***A45C 11/20*** | (2006.01) |
| ***F25D 3/08*** | (2006.01) |
| ***B65D 81/38*** | (2006.01) |
| ***B65D 1/14*** | (2006.01) |
| ***B65D 1/20*** | (2006.01) |
| ***B65D 1/34*** | (2006.01) |
| ***B65D 25/28*** | (2006.01) |
| ***B65D 43/02*** | (2006.01) |
| ***B67D 3/00*** | (2006.01) |

(52) U.S. Cl.

CPC .............. *B65D 81/3806* (2013.01); *B65D 1/14* (2013.01); *B65D 1/20* (2013.01); *B65D 1/34* (2013.01); *B65D 25/2885* (2013.01); *B65D 25/2888* (2013.01); *B65D 43/02* (2013.01); *B67D 3/00* (2013.01)

(58) Field of Classification Search

CPC ............. F25D 3/08; A45C 11/20; A47J 47/14

USPC .......... 220/755, 592.16, 592.18, 592.23, 720, 220/729, 767, 915.1, 915.2, 23.83, 23.86; 206/216, 217, 549, 430, 557; 222/465.1, 185.1, 129; 62/371, 457.1, 62/457.7

See application file for complete search history.

(56) References Cited

U.S. PATENT DOCUMENTS

| | | | | | |
|---|---|---|---|---|---|
| 2,117,276 | A | * | 5/1938 | Davis | 215/13.1 |
| 3,308,636 | A | * | 3/1967 | Schaaf | 62/400 |
| 4,978,023 | A | * | 12/1990 | Behlmann et al. | 220/23.6 |
| 5,261,554 | A | * | 11/1993 | Forbes | 220/592.16 |
| 5,423,426 | A | * | 6/1995 | Harper | 206/545 |
| D365,969 | S | * | 1/1996 | Sellman | D7/608 |
| 5,967,362 | A | * | 10/1999 | Corbin | 220/758 |
| 6,085,926 | A | * | 7/2000 | Weiss | 220/23.86 |

(Continued)

*Primary Examiner* — Bryon P. Gehman
*Assistant Examiner* — Shawn M Braden
(74) *Attorney, Agent, or Firm* — Marshall, Gerstein & Borun LLP

(57) ABSTRACT

A cooler comprises a body having a bottom edge and at least one handle positioned near the bottom edge of the cooler. The handle may be located below the center of gravity of the cooler or within approximately 2 to 3 inches of the bottom edge of the cooler. The body and the handle may be formed as one-piece and from molded plastic. The handle may also be mounted on a separate handle tray where the tray is secured to the body. A spigot may be provided for dispensing fluid from said body. The body may comprise an insulated wall construction. A removable lid may be used to close the opening. A handle may also be positioned near the top edge.

8 Claims, 7 Drawing Sheets

(56) References Cited

U.S. PATENT DOCUMENTS

| | | | | |
|---|---|---|---|---|
| 6,158,610 | A * | 12/2000 | Kolvek | 220/573 |
| 6,581,796 | B1 * | 6/2003 | Pilkinton | 220/495.04 |
| 7,249,772 | B2 * | 7/2007 | Bruns | 280/47.34 |
| 7,269,969 | B2 * | 9/2007 | Strickland et al. | 62/400 |
| 7,328,816 | B2 * | 2/2008 | Shannon et al. | 222/185.1 |
| 7,328,818 | B2 * | 2/2008 | Prabucki | 222/146.6 |
| D635,819 | S * | 4/2011 | Molayem | D7/357 |
| 2007/0187435 | A1 * | 8/2007 | Quirk | 222/481 |

* cited by examiner

INSULATED COOLER

This application claims benefit of priority under 35 U.S.C. §119(e) to the filing date of to U.S. Provisional Application No. 61/285,721, as filed on Dec. 11, 2009, which is incorporated herein by reference in its entirety.

The invention relates generally to liquid containers and more particularly to insulated coolers.

BACKGROUND

A typical insulated cooler comprises an insulated body that defines an internal cavity for retaining a liquid such as a potable drink. The internal cavity may terminate in a large opening at the top of the body that is closed by an insulated lid. The liquid may be dispensed by a spigot located near the bottom of the cavity such that when the spigot is opened the liquid drains from the body under gravity. The cavity may be quickly filled by removing the lid to pour a liquid into the cavity or quickly emptied by removing the lid and turning the body upside down to drain the contents from the cavity. The cooler may include handles near the top of the body just below where the lid attaches to the body.

SUMMARY OF THE INVENTION

A cooler comprises a body having a bottom edge and a handle positioned near the bottom edge of the cooler. The handle may be located below the center of gravity of the cooler. The handle may be located within approximately 2 to 3 inches of the bottom edge of the cooler. The body and the handle may be formed as one-piece and from molded plastic. A second handle may be positioned near the bottom of the cooler and may be spaced from the first handle. The handle may also be mounted on a separate handle tray where the tray is separately attached to the cooler body. A spigot may be provided for dispensing fluid from said body. The body may comprise an insulated double wall construction. A removable lid may be used to close the opening in the body. An additional upper handle may also be positioned near the top edge of the body.

DETAILED DESCRIPTION OF EMBODIMENTS OF THE INVENTION

Figure 1:
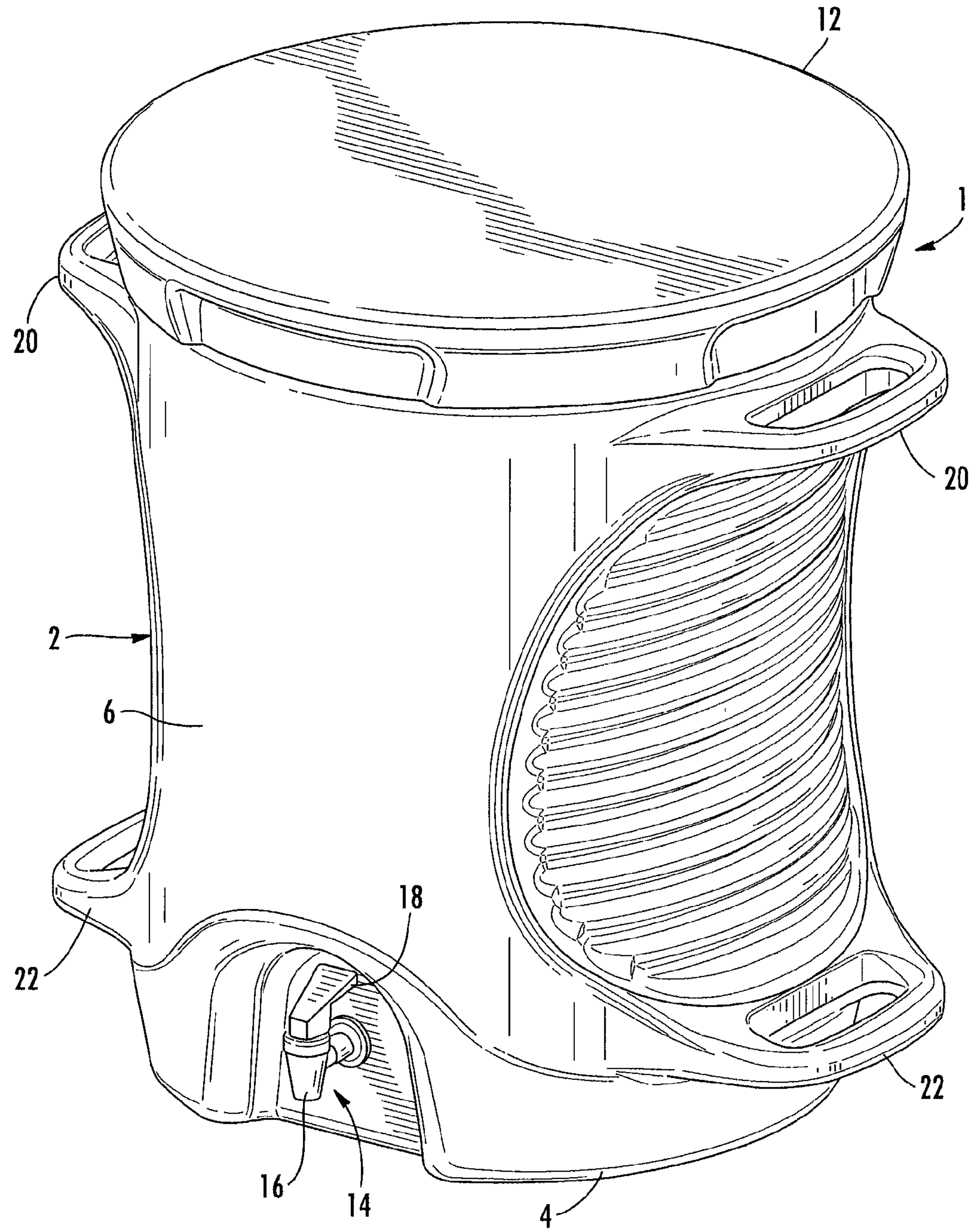
FIG. 1 is a perspective view of an embodiment of a cooler with the handles of the invention.
Figure 2:
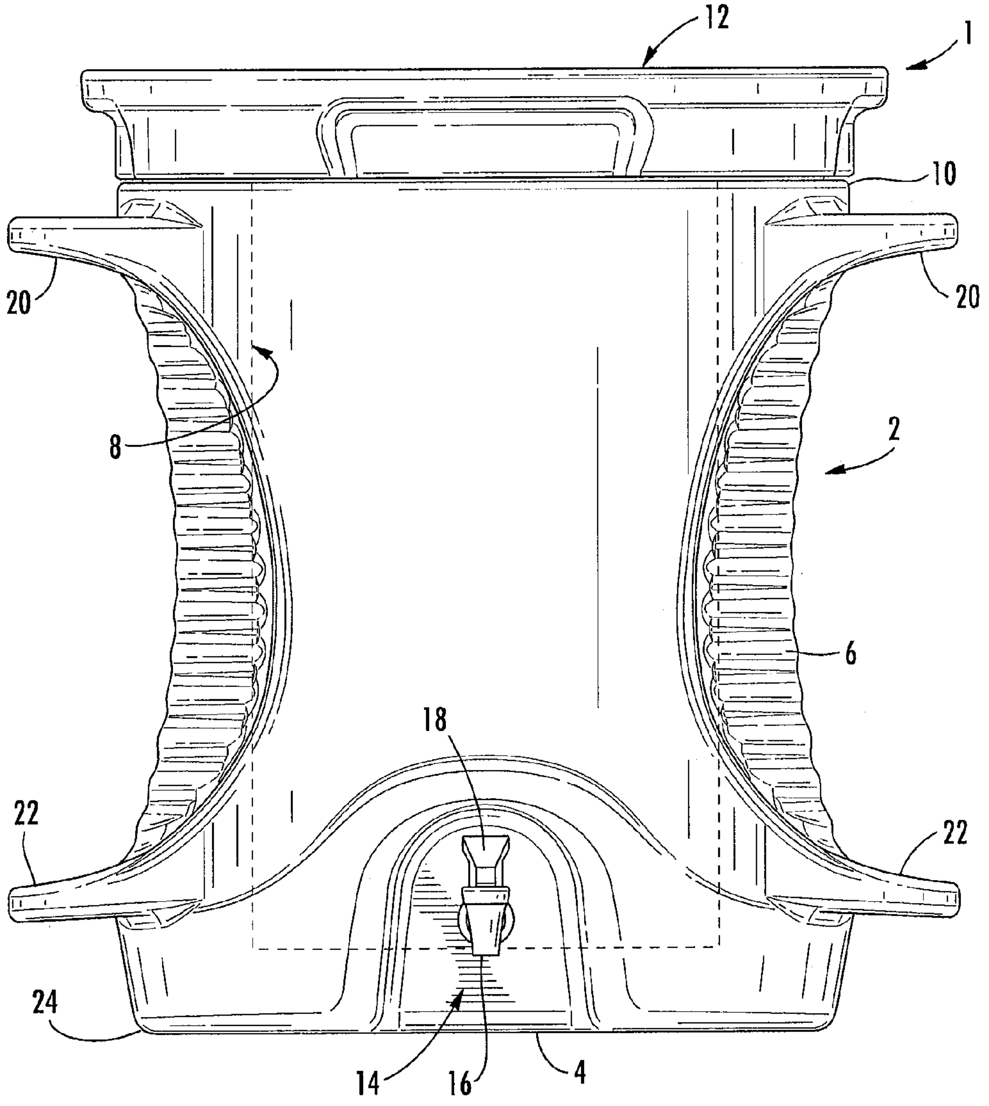
FIG. 2 is a front view of the embodiment of the cooler of FIG. 1.
Figure 3:
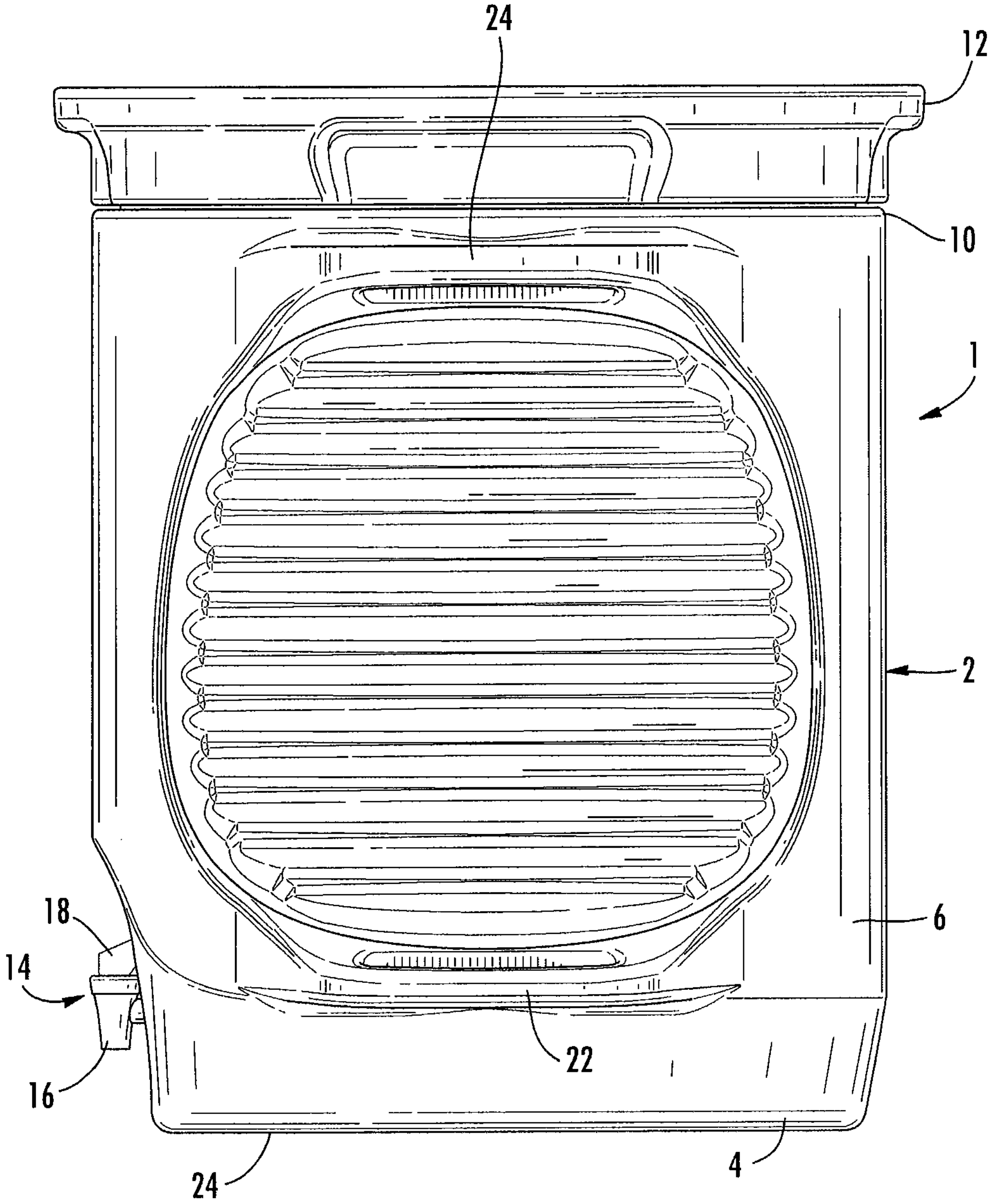
FIG. 3 is a side view of the embodiment of the cooler of FIG. 1.
Figure 4:
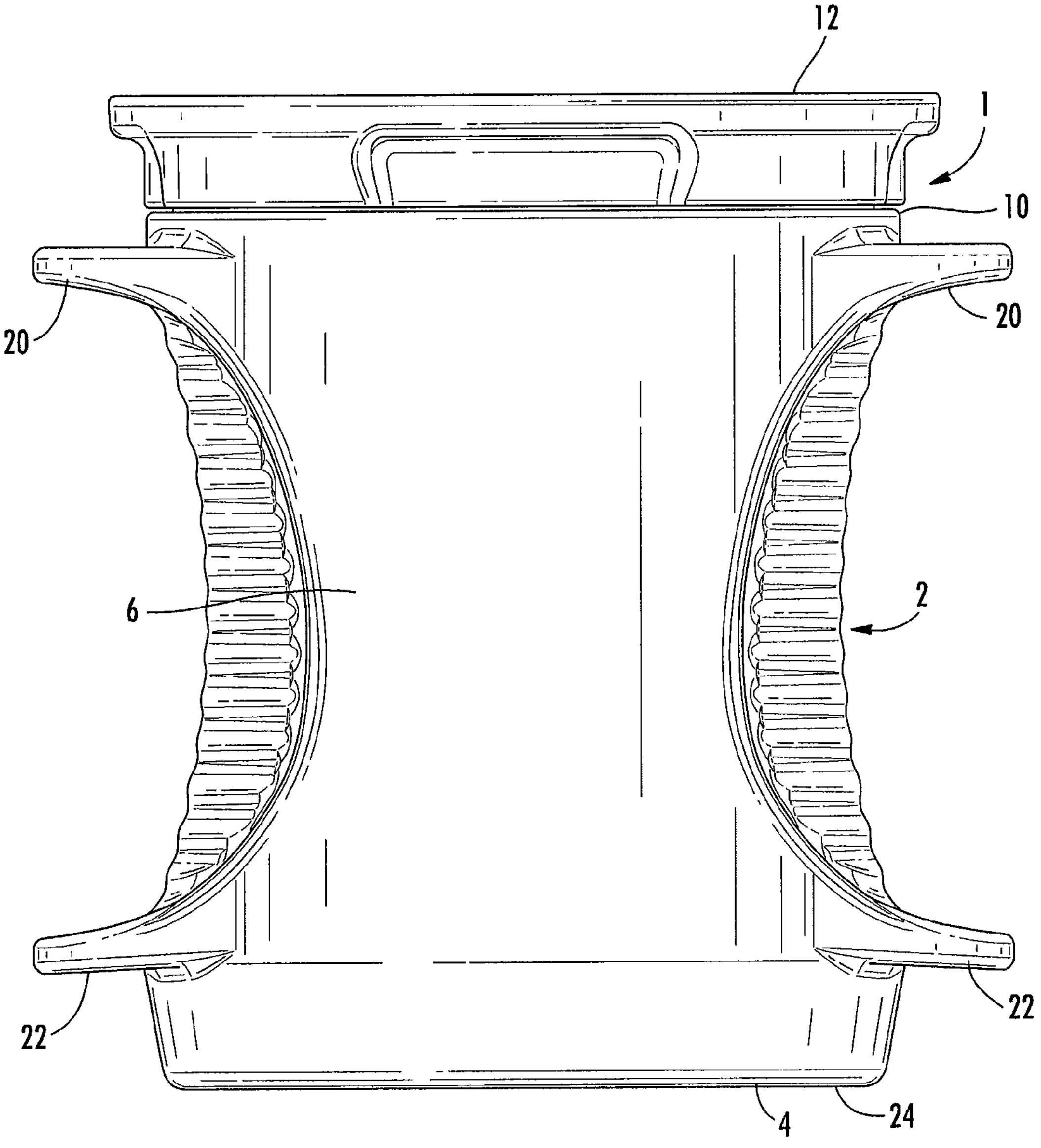
FIG. 4 is a back view of the embodiment of the cooler of FIG. 1.

The insulated cooler of the invention is shown generally at 1 in FIGS. 1 through 4 and comprises a body 2 that defines an internal cavity 8 for receiving and retaining a quantity of liquid such as a potable drink. The body 2 is defined by a bottom wall 4 and a side wall 6 that extends from the bottom wall 4. The side wall 6 terminates in an upper rim or edge 10 that defines a large upwardly facing opening 11 that allows access to the cavity 8. In the illustrated embodiment the body 2 is generally cylindrical although the body may have any suitable shape. A lid 12 engages side wall 6 and rim 10 to close the cavity and create a thermally insulated container for the liquid contained in cavity 8. The lid 12 may engage and be secured to the body 2 by a friction fit, by a threaded connection, by separate locking devices or by any suitable connection that secures the lid to the body. The lid 12 may be removed from the body 2 and the cavity 8 may be filled by pouring a liquid into the cavity 8 or quickly emptied by turning the body upside down and draining liquid from the cavity through the top opening.

The bottom wall 4, side wall 6 and lid 12 may have any thermally insulating construction. In one embodiment the bottom wall 4, side wall 6 and lid 12 have a double wall construction where the body 2 comprises an exposed exterior jacket that is spaced from an interior vessel that defines cavity 8 to create an insulating space therebetweeen. The insulating space may be filled with a thermally insulating material such as 2-part polyurethane foam.

A spigot 14 is positioned in the body near the bottom of cavity 8 such that liquid may be dispensed from the cooler by opening the spigot. The spigot 14 typically includes a spout 16 having an internal valve that is opened by manipulation of the lever 18. Upon opening of the spigot 14, fluid in cavity 8 may drain by gravity from the cooler and be dispensed to a user. One such cooler design is shown in U.S. Pat. No. 7,455,281 issued on Nov. 25, 2008 to Rubbermaid Incorporated, the disclosure of which is incorporated by reference herein in its entirety. In use the cooler 1 typically rests on bottom wall 4 such that the side wall 6 extends vertically and opening 11 faces upwardly. The cavity 8 may be filled through opening 11 and liquid in the cavity 8 may be dispensed through the spigot 14.

A first pair of handles 20 may be provided near or at the upper edge 10 of the body 2 such that the handles 20 may be grasped by the user to lift and carry the cooler 1. In one embodiment the handles 20 may be formed integrally and as one-piece with the side wall 6 such as by molding the sidewall 6 and handles 20 of plastic in a single molding operation. Alternatively, the handles 20 may be formed separately from the body 2 and attached to the body using separate fasteners, adhesive, welding or the like.

To quickly empty the contents of the cooler, the lid 12 is removed and the cooler is tipped and turned upside down or nearly upside down such that the contents of the cooler may quickly be poured from cavity 8 through opening 11. The handles 20 located at the top of the body 2 make it difficult for a user to lift a filled cooler, turn it over and dump out the contents of the cooler. In the case of a 10 gallon cooler full of liquid, the contents, if water based, may weigh approximately 80 pounds. The position of the top handles 20 make it difficult for the user to grasp the upper handles 20 and tip the cooler to empty the contents from cavity 8.

The cooler body 2 incorporates handles 22 positioned near the bottom edge 24 of the cooler body 2. The bottom edge 24 of body 2 is defined by the outer surface on which the cooler rests during use. The handles 4 may be spaced from the bottom edge 24 of the cooler a sufficient distance to allow a user's hand to fit below and grasp the handles 22. Preferably, the handles 22 are located below the center of gravity of the cooler. In one preferred embodiment the handles 22 are located between approximately 2 and 3 inches above the bottom edge 24 of the cooler to provide access for the user's hand, and the handles may be located about 2.5 inches from the bottom edge 24. The handles 22 may disposed on opposite sides of the cooler such that they are spaced from one another approximately 180° although the handles 22 may be spaced from one another about the periphery of the body any distance that enables a user to comfortably grasp the handles and lift and tilt the cooler. In one embodiment the handles 22 may be formed integrally and as one-piece with the side wall 6 such as by molding the side wall and handles of plastic in a single molding operation. Alternatively, the handles 22 may be formed separately from the body 2 and attached to the body using separate fasteners, adhesive, welding or the like. The handles are ergonomically designed for consumer use and strong enough to lift the contents without damage to the cooler. With the handles 22 placed near the bottom edge 24 of the cooler, the lower handles 22 aid in lifting the cooler overhead and tipping of the cooler past its center of gravity for ease of emptying the contents through opening 11. The low handles 22 may be provided in addition to the upper handles 20 such that handles 22 are spaced below handles 20 along the height of cooler 1.

The cooler may be made by using a cooler jacket manufactured in plastic resin and molding the handles integrally with the jacket. The jacket and integral handles could be manufactured via blow molding, injection molding, or rotational molding. Alternatively, the handles could be separate components affixed to the jacket body after the jacket and handles are manufactured. In this case the handles could be made of metal or plastic and affixed to the jacket body via mechanical fasters.

Figure 5:
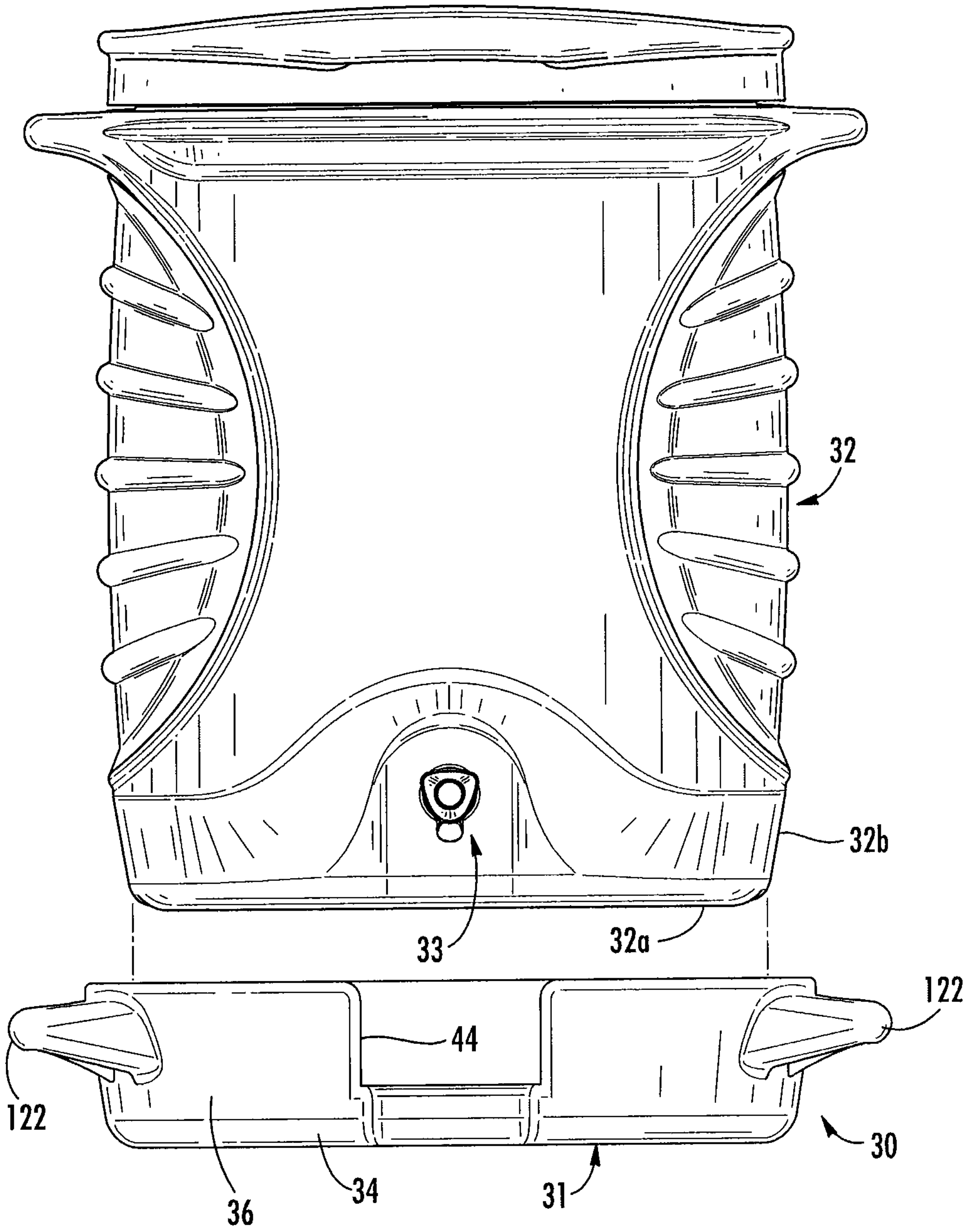
FIG. 5 is an exploded front view of a second embodiment of a cooler provided with the handle tray of the invention.
Figure 6:
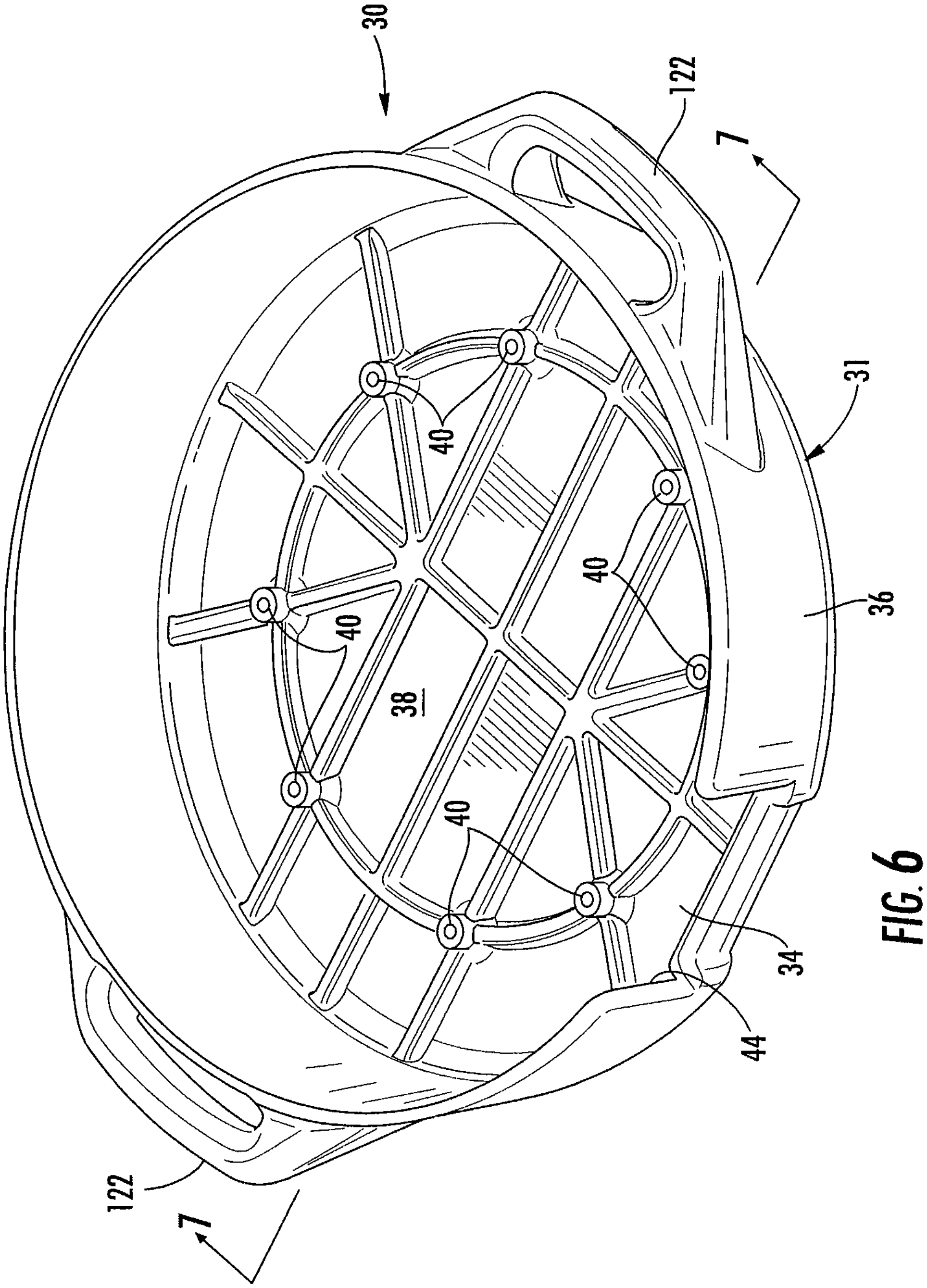
FIG. 6 is a perspective view of the embodiment of the handle tray of FIG. 5.
Figure 7:
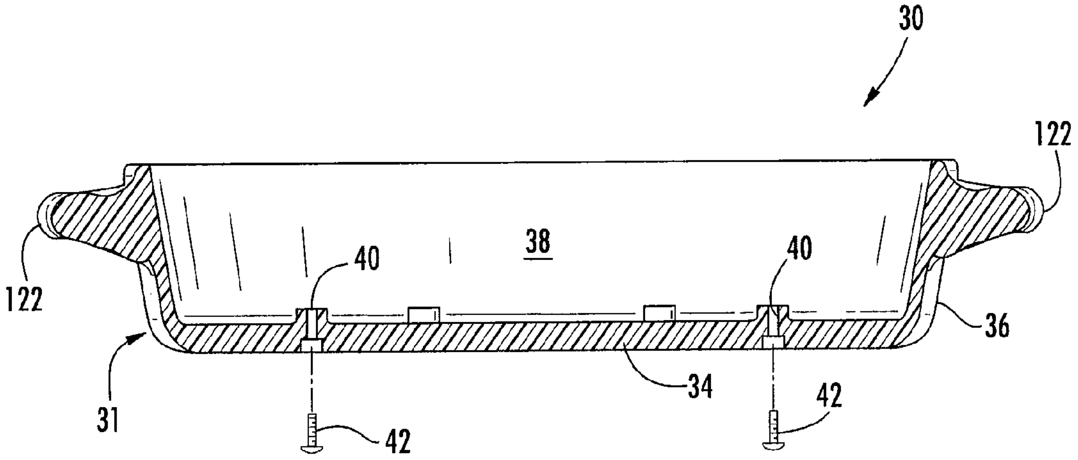
FIG. 7 is a section view of the embodiment of the handle tray of FIG. 5

Referring to FIGS. 5, 6 and 7 the lower handles 122 may be molded as part of a separate handle tray 30 that is attached to a standard two-handled cooler 32. The tray 30 comprises a frame 31 that supports handles 122 and that is secured to the cooler 32. Frame 31 comprises a bottom wall 34 and a side wall 36 extending from the bottom wall 34 to define an internal space 38 for receiving the bottom edge of a cooler. The tray 30 is configured such that the bottom portion of a cooler with which the tray is to be used will fit into the space 38. Because in the illustrated embodiment the cooler 32 has a cylindrical shape the side wall 36 and bottom wall 34 cooperate to define a mating cylindrical space 38. The shape of the handle tray 30 may be selected to match any cooler configuration. The side wall 36 is provided with a space or gap 44 for receiving the spigot 33 of the cooler 32.

The bottom portion of the cooler 32 is inserted into tray 30 such that the bottom wall 32*a* of the cooler rests on the bottom wall 34 of the tray 30, the side wall 36 of the tray extends over a portion of the side wall 32*b* of the cooler a short distance and the spigot is positioned in space 44. The cooler may be connected to the tray 30 using a connection mechanism such as friction fit, mechanical fit, adhesive, fasteners such as screws, hook and loop, or the like. The connection mechanism may be permanent such as adhesive, releasable such as screws or easily releasable such as a quick release clasp. In the illustrated embodiment the bottom wall 34 is provided with a plurality of apertures 40 for receiving fasteners 42 such as threaded screws. The screws 42 may be inserted into the apertures 40 and screwed into the bottom wall of the cooler to secure the tray to the cooler. The handles 122 are positioned on tray 30 such that when the tray is attached to the cooler the handles 122 are positioned near the bottom edge of the cooler. As in the previous embodiment the handles 122 may be spaced from the bottom edge of the cooler a sufficient distance to allow a user's hand to fit below and grasp the handles 22. Preferably, the handles 122 are located below the center of gravity of the cooler. In one preferred embodiment the handles 122 are located approximately 2 to 3 inches from the bottom edge of the cooler when the tray is attached to the cooler, and the handles may be located about 2.5 inches from the bottom edge of het cooler. In this way the handle tray 30 may be integrated or retrofit into existing coolers and the low handles may be provided on any cooler.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A cooler comprising:

a generally cylindrical body comprising a side wall defining an upwardly facing opening and a bottom wall and having a bottom edge located adjacent the bottom wall and a top edge located adjacent the opening; the side wall and bottom wall comprising a double wall construction comprised of an interior vessel having a capacity of at least approximately 10 gallons and an exterior jacket spaced from the interior vessel to define an insulating space between the inner vessel and the outer jacket;

a first bottom handle and a second bottom handle extending outwardly from a periphery of the exterior jacket and positioned above the bottom edge of the body a sufficient distance to allow a user's hand to fit below and grasp the first and second bottom handles when the bottom wall rests on a surface, the first bottom handle and the second bottom handle being spaced from one another about the periphery of the body approximately 180 degrees, and a first top handle and a second top handle being positioned near the top edge of the body, the first top handle and the second top handle being spaced from one another about the periphery of the body approximately 180 degrees, wherein the outer jacket, the first and second top handles, and the first and second bottom handles are one-piece.

2. The cooler of claim 1 wherein the first bottom handle and the second bottom handle are located below the center of gravity of the body.

3. The cooler of claim 1 wherein the first bottom handle and the second bottom handle are located approximately 2 to 3 inches from the bottom edge of the body.

4. The cooler of claim 1 wherein the outer jacket, the first bottom handle, the second bottom handle, the first top handle, and the second top handle are one-piece molded plastic.

5. The cooler of claim 1 further comprising a spigot for dispensing fluid from said body.

6. The cooler of claim 1 further comprising a removable lid for closing said opening.

7. The cooler of claim 1 where the bottom wall supports the body in a vertical orientation.

8. The cooler of claim 1 wherein the first bottom handle is located directly below the first top handle.

* * * * *